United States Patent Office 3,223,851
Patented Dec. 14, 1965

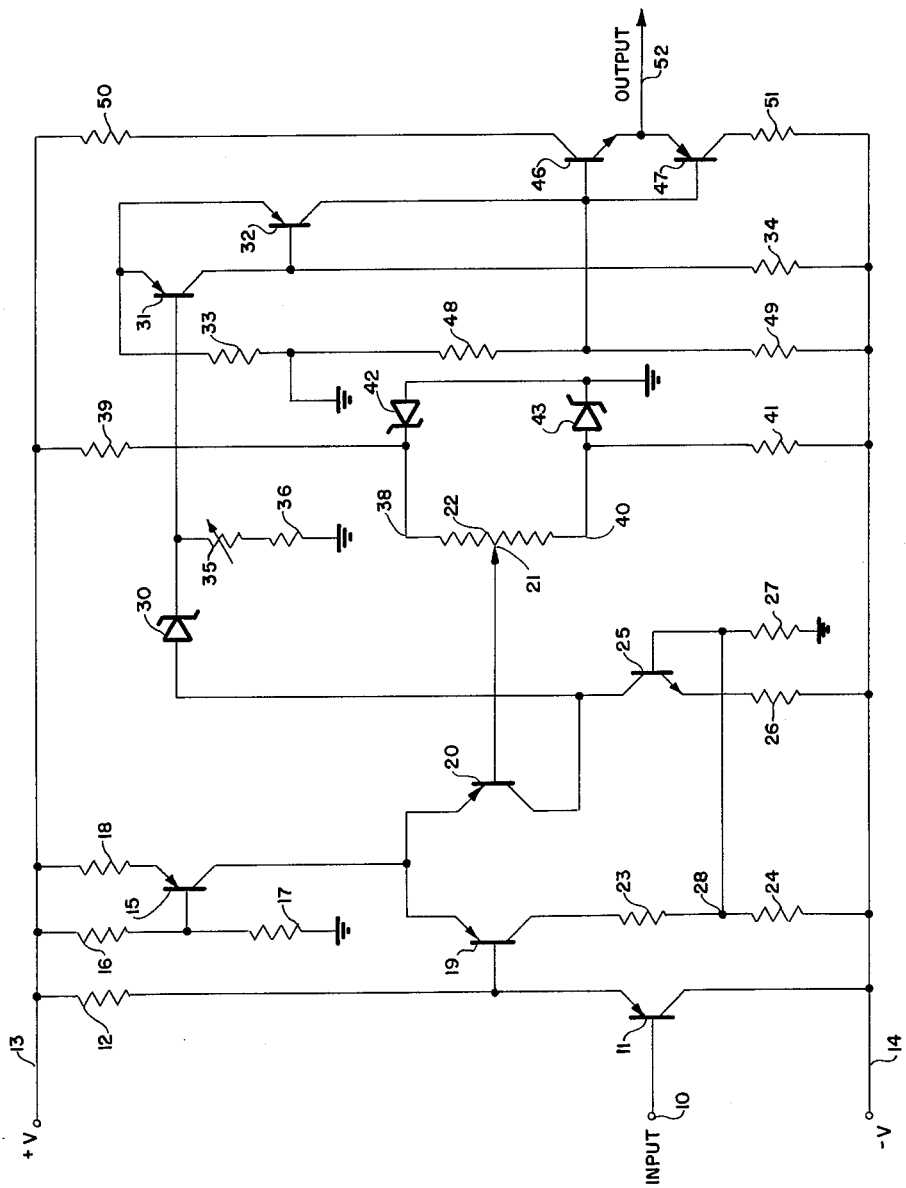

3,223,851
TRANSITION DETECTOR
William L. Kitchens, Costa Mesa, and Ronald J. Surprenant, Fullerton, Calif., assignors to Beckman Instruments, Inc., a corporation of California
Filed June 14, 1962, Ser. No. 202,437
1 Claim. (Cl. 307—88.5)

This invention relates to a transition detector and more particularly to a detector for accurately detecting the time at which a varying voltage waveform reaches a preset reference voltage level.

In the fields of data processing, telemetry, etc., it is often necessary to detect particular signal transitions, such as, the transition of a pulse from a negative value to a positive value, or vice versa. Equipment which must utilize or operate on these signals must be synchronized with the signals in order to function properly. Synchronization may be obtained by detecting the transitions of the signal and providing output signals or markers indicative of the time of occurrence of these transitions. Signal transitions may be detected by detecting the time at which the transitions reach a preset reference voltage level. It is desirable that the preset voltage level be adjustable over a wide voltage range. Furthermore, the sensitivity and accuracy of the detection of the coincidence of the level of the input signal transition with that of the reference voltage must remain essentially constant over the full range of reference voltage levels. Previous devices for detecting signal transitions have not provided the required accuracy in detecting transitions, and have not provided constant sensitivity and accuracy of detection over a wide range of reference voltage levels.

Accordingly, it is a feature of the present invention to provide an apparatus for detecting signal transitions which accurately detects the time at which a varying voltage waveform reaches a preset variable reference voltage level.

It is a further feature of the present invention to provide a transition detector for accurately detecting the time at which a varying voltage waveform reaches a preset reference voltage level and in which the sensitivity and accuracy of detection of transitions remains essentially constant over a wide range of reference voltage levels.

An additional feature of the present invention is the provision of a transition detector in which the determination of a coincidence level is based upon the switching of a constant current, which provides for constant gain of the detector throughout a wide range of adjustable reference levels.

A further feature of the present invention is the utilization of common base transistor circuits as constant current devices in a transition detector and in which the variation of the reference voltage level over a wide range can be accomplished without loss of accuracy while employing power supply voltages not substantially higher than the maximum range of the adjustable reference voltage.

The present invention provides a transition detector which accurately detects the time at which a varying voltage waveform reaches a preset reference voltage level. The preset voltage level is adjustable over a predetermined range. When a transition of the input signal crosses the preset voltage level, a constant current is switched from one path to another. The switching of the constant current from one path to another controls the operation of a trigger circuit to provide an output signal indicative of the transition.

Other features and objects of the invention will be better understood from a consideration of the following detailed description when read in conjunction with the attached drawing which illustrates a transition detector constructed in accordance with the teachings of the present invention.

An input signal, the transitions of which are to be detected, is applied to an input terminal 10. This input signal may be of any type having a varying voltage waveform, and a frequency range of zero to megacycles. The signal is applied from the input terminal 10 to the base of a PNP transistor 11. The emitter of the transistor 11 is connected through a resistance 12 to a line 13 which is connected to the positive terminal of a voltage source (not shown). The collector of the transistor 11 is connected to a line 14 which is connected to the negative terminal of the voltage source. The voltage source may be, for example, a 12-volt source. A constant current source is provided by a PNP transistor 15 and its associated components. The base of the transistor 15 is connected between a pair of resistances 16 and 17 which are connected in series between the line 13 and ground. The emitter of the transistor 15 is connected through a resistance 18 to the line 13.

The collector of the transistor 15 is connected to the emitters of a pair of PNP transistors 19 and 20. The base of the transistor 19 is connected to the emitter of the transistor 11, and the base of the transistor 20 is connected to a variable contact 21 of a potentiometer 22. The collector of the transistor 19 is connected through resistances 23 and 24 to the line 14. The collector of the transistor 20 is connected to the collector of an NPN transistor 25 which serves as a constant current sink. The emitter of the transistor 25 is connected through a resistance 26 to the line 14. The base of the transistor 25 is connected through a resistance 27 to ground, and a connection is provided between the base of this transistor and a terminal 28 between the resistances 23 and 24 to increase the gain and speed of the circuit. The maximum gain bandwidth operating point is approached by utilizing the transistors 19 and 20 as current switches.

The collector of the transistor 25 is connected through a diode 30, which may be a zener diode, to the base of a PNP transistor 31. The transistor 31 and a PNP transistor 32 are connected as a current coupled Schmitt trigger. The diode 30 is used for D.C. translation and allows the trigger to operate around a ground level. The emitters of the transistors 31 and 32 are connected together, and the collector of the transistor 31 is connected to the base of the transistor 32. The emitters of the transistors 31 and 32 are connected to ground through a resistance 33, and the collector and base of the respective transistors 31 and 32 are connected to the line 14 through a resistance 34. The base of the transistor 31 is connected through a variable resistance 35 and a resistance 36 to ground. The variable resistance 35 is employed for compensation of circut constants.

The upper terminal 38 of the potentiometer 22 is connected through a resistance 39 to the line 13, and the lower terminal 40 of the potentiometer is connected through a resistance 41 to the line 14. The terminal 38 is connected through a diode 42 to ground, and the terminal 40 is connected through a diode 43 to ground. The diodes 42 and 43 provide improved voltage regulation, and they may be zener diodes.

The collector of the transistor 32 is connected to the bases of complementary emitter-follower transistors 46 and 47. The bases of the transistors 46 and 47 are connected to a common terminal between a pair of resistances 48 and 49 which are connected between ground and the line 14. The collector of the transistor 46 is connected through a resistance 50 to the line 13, and the collector of the transistor 47 is connected through a resistance 51 to the line 14. The emitters of the transistors 46 and 47 are connected together and to an output line 52.

The desired reference transition level is set by adjusting the movable contact 21 of the potentiometer 22. The sensitivity of the detector is not affected by different settings of the reference transition level. The level may be set at any desired voltage, such as, any voltage between negative 5.5 and positive 5.5 volts. In considering the operation of the transition detector of the present invention, it is first assumed that a voltage waveform applied to the input terminal 10 is more positive than the transition level set by the potentiometer 22. In this case, the transistor 19 is nonconducting. The transistor 11 conducts at all times for input signals between ±V. This transistor is an emitter-follower which serves to provide a high input impedance. Current flows from the line 13 through the resistance 18, the emitter-collector path of the transistor 15, the emitter-collector path of the transistor 20, the collector-emitter path of the transistor 25, the resistance 26 and the line 14 back to the voltage source. The transistor 15 acts as a constant current source and the transistor 25 functions as a constant current sink. At this time, the current through the zener diode 30 is at a minimum and the voltage drop across the resistances 35 and 36 is at a minimum holding the transistor 31 off. When the transistor 31 is off, the transistor 32 is on and maintains the output line 52 substantially at ground because one of the transistors 46 or 47 also is on. Whichever transistor 46 or 47 is on depends on the load applied to the ouput line 52. If the output line 52 is connected through a resistance to substantially ground potential, the transistor 47 is on, and if the output line 52 is connected through a resistance to a negative potential (−V) the transistor 46 is on.

Assuming now that the signal transition goes negative and crosses the transition or threshold potential determined by the setting of the potentiometer 22, the signal applied to the base of the transistor 19 from the transistor 11 moves the base of the transistor 19 to a point where the latter transistor begins to conduct. The transistor 20 turns off and the current from the constant current source transistor 15 is switched from the emitter-collector path of the transistor 20 to the emitter-collector path of the transistor 19. This action forces the constant current sink transistor 25 to seek all of its current from the resistances 35 and 36 and the zener diode 30. The amount of constant current drawn by the transistor 25 is increased because of the connection between the base of the transistor 25 and the junction 28. The arrangement increases loop gain and the speed of operation of the transition detector. The current through the resistances 35 and 36 increases. This increases the voltage drop across the resistances 35 and 36 driving the base of the transistor 31 negative thereby turning this transistor on. When the transistor 31 turns on, the transistor 32 turns off and the potential on the output line 52 goes negative.

The output on the line 52 remains negative until the signal again crosses the transition level determined by the setting of the potentiometer 22 in a positive going direction. When this occurs, the constant current from the transistor 15 is switched back to the transistor 20 from the transistor 19. The current through the resistances 35 and 36 and through the diode 30 is reduced as discussed above, and the transistor 31 turns off. When the transistor 31 turns off, the transistor 32 turns on thereby returning the potential on the output line 52 to its more positive value.

It now should be apparent that the present invention provides a detector for accurately detecting the time at which a varying voltage waveform reaches a preset voltage level. The determination of this coincidence level is based upon the switching of a constant current which provides for constant gain of the detector regardless of the adjustable reference level. By the use of a constant current source and a constant current sink, the reference voltage level may be varied over a wide range without loss of accuracy while using power supply voltages not greatly higher than the maximum range of the adjustable reference voltage. Additionally, the variation of the adjustable reference voltage over its full range does not affect the sensitivity of the detector.

Although particular components, voltages, ranges of operation, etc., have been discussed in connection with a specific example of a circuit constructed in accordance with the present invention, others may be utilized. Furthermore, it will be understood that although an exemplary embodiment of the present invention has been disclosed and discussed, other applications and circuit arrangements are possible and that the embodiment disclosed may be subjected to various changes, modifications and substitutions without necessarily departing from the spirit of the invention.

What is claimed is:

A transition detector for detecting transitions of an input signal comprising a constant current source including a transistor,
    a constant current sink including a transistor having at least a base electrode,
    a transistor for receiving said input signal,
    variable potential means for generating a setable constant reference voltage at a level which may be varied over a wide range,
    first means interconnecting said constant current source, said constant current sink, said input transistor, and said potential means for conducting current from said current source to said current sink when the magnitude of transitions of said input signal is below said reference voltage and for diverting said current from said current sink when the magnitude of transitions of said input signal exceeds said reference voltage,
    second means connected with said current sink for supplying current thereto when current from the current source is diverted therefrom,
    output means connected with said second means and responsive thereto for providing output signals indicative of said signal transitions third means connecting said first means to the base of said constant current sink transistor to accelerate occurrence of said output signals on transition.

References Cited by the Examiner

UNITED STATES PATENTS

| | | | |
|---|---|---|---|
| 2,676,286 | 4/1954 | Buchner | 328—146 |
| 2,886,659 | 5/1959 | Schroedor | 330—69 |
| 2,930,982 | 3/1960 | Patterson | 330—69 |
| 3,046,469 | 7/1962 | Young | 307—88.5 |
| 3,054,910 | 9/1962 | Bothwell | 307—88.5 |
| 3,076,135 | 1/1963 | Farnsworth et al. | 307—88.5 |
| 3,124,698 | 3/1964 | Semmer et al. | 307—88.5 |

ARTHUR GAUSS, *Primary Examiner.*

GEORGE N. WESTBY, JOHN W. HUCKERT,
                                    *Examiners.*